March 9, 1954     O. B. MACOMBER     2,671,890
BATTERY POST TERMINAL
Filed May 10, 1951
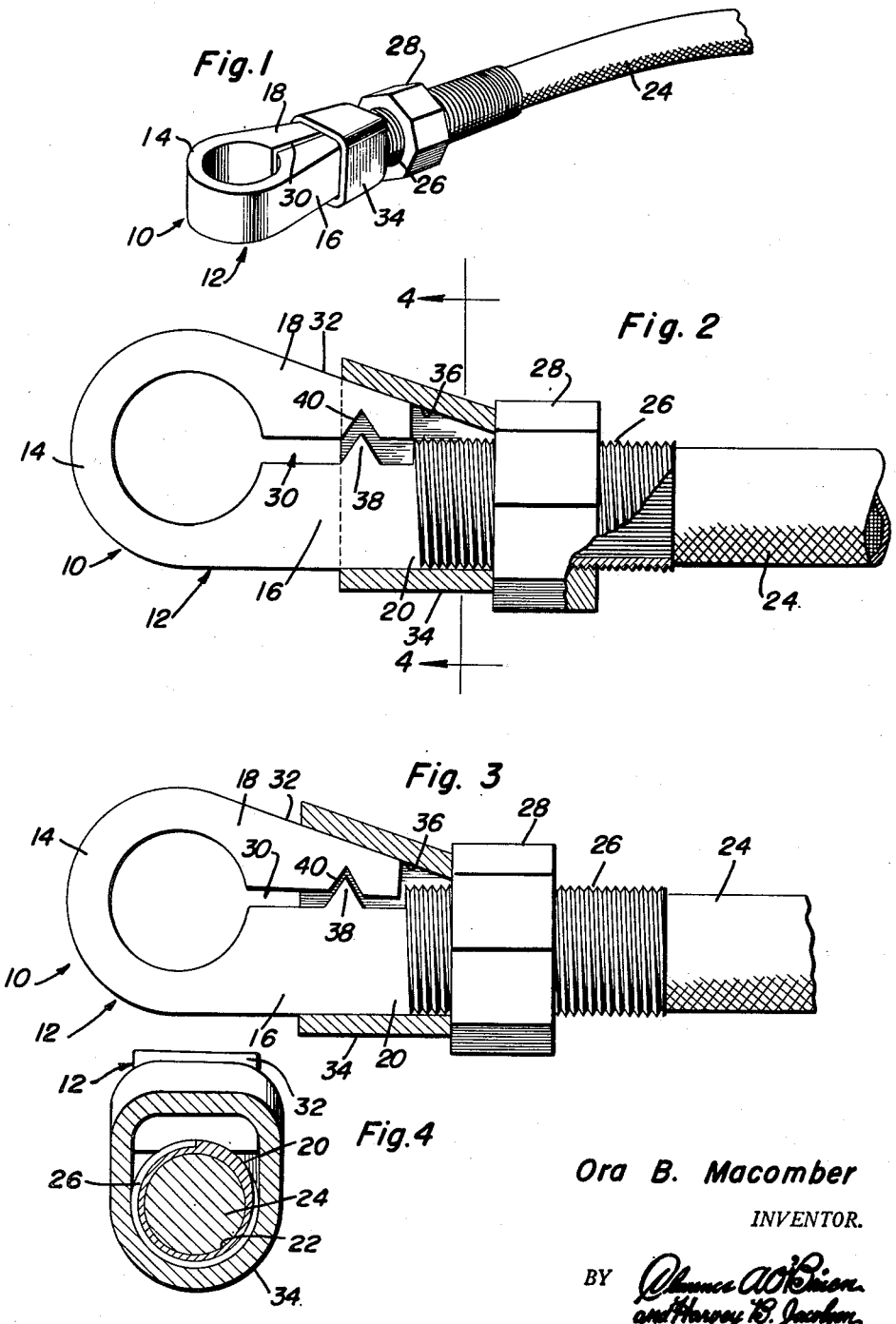
Ora B. Macomber
INVENTOR.

Patented Mar. 9, 1954

2,671,890

UNITED STATES PATENT OFFICE 2,671,890

BATTERY POST TERMINAL

Ora B. Macomber, Milwaukee, Wis.

Application May 10, 1951, Serial No. 225,523

1 Claim. (Cl. 339—230)

This invention relates to new and useful improvements and structural refinements in battery post terminals, and the principal object of the invention is to assure a proper electrical connection between the battery cable and the battery post, while facilitating highly convenient and expeditious separation of the terminal from the battery post, when so desired.

The above object is achieved by the provision of a terminal which embodies in its construction a split clamp together with a nut-actuated sleeve for contracting the clamp to frictionally engage the battery post, this construction being such as to eliminate the use of conventional clamping bolts, screws, or the like.

Some of the advantages of the invention reside in its simplicity of construction, in its efficient and dependable operation, and in its adaptability to economical manufacture.

With the above more important objects and features in view and such other objects and features as may become apparent as the specification proceeds, the invention consists essentially in the arrangement and construction of parts as illustrated in the accompanying drawings, in which:

Figure 1 is a perspective view of the invention applied to the end of a battery cable;

Figure 2 is a top plan view of the device as shown in Figure 1, the same being partially broken away so as to reveal its construction, and being illustrated in its expanded position;

Figure 3 is a view similar to that shown in Figure 2, but illustrating the split clamp in its contracted position, Figure 4 is a transverse sectional detail, taken substantially in the plane of the line 4—4 in Figure 2.

Like characters of reference are employed to designate like parts in the specification and throughout the several views.

Referring now to the accompanying drawings in detail, the invention consists of a battery post terminal which is designated generally by the reference character 10 and embodies in its construction a split clamp 12 including an eye portion 14 which is adapted to be positioned on a battery post, while a pair of clamp members or arms 16, 18 extend in spaced, adjacent relation to one side of the eye portion 14, as will be clearly apparent.

The clamp member 16 is formed integrally with an elongated shank 20 which has its outer end portion provided with a socket 22 (see Figure 4) to receive an end portion of a battery cable 24, and it will be noted that the shank 20 is externally screw-threaded as at 26 to accommodate a clamping nut 28.

It will be also observed that the "split" 30 of the clamp 12 is disposed in a plane which is parallel to the longitudinal axis of the shank 20, and that the clamp member 18 is provided at the outside thereof with a wedge surface 32.

A hollow sleeve 34, which in cross-section is configurated as is best shown in Figure 4, is positioned on the clamp members 16, 18 in abutment with the nut 28 and is provided at one side thereof with an inner wedge surface 36 to slidably engage the wedge surface 32 of the clamp member 18, so that after the eye portion 14 of the clamp 12 is applied to a battery post, tightening of the nut 28 will cause the sleeve 34 to slide toward the eye portion 14 and the sliding engagement of the wedge surfaces 32, 36 will cause the clamp to contract into firm gripping engagement with the battery post. Needless to say, the terminal may be readily disconnected by simply loosening the nut 28.

In order to sustain the clamp members 16, 18 in proper alignment, that is, in order to prevent any shifting thereof longitudinally, one with respect to the other, a substantially triangular keeper or lug 38 projects from the clamp member 16 into a substantially triangular notch or recess 40 in the clamp member 18, as is clearly shown in Figures 2 and 3.

It is believed that the advantages and use of the invention will be clearly understood from the foregoing disclosure and, accordingly, further description thereof at this point is deemed unnecessary.

Having described the invention, what is claimed as new is:

A battery cable terminal comprising, a clamp including a split, resilient eye for the reception of a battery post, a pair of spaced, opposed arms integral with the ends of said eye, one of said arms being substantially tapered and having a tapered recess in its inner face, an externally threaded longitudinal socket member on the free end of the other arm for the reception of a battery cable, a substantially tapered sleeve slidably mounted on the arms, a nut threaded on the socket member and engaged with said sleeve for actuating same for contracting the eye on the post, and a tapered lug on the inner face of said other arm engageable in the recess for positively preventing relative longitudinal movement of the arms.

ORA B. MACOMBER.

References Cited in the file of this patent

UNITED STATES PATENTS

| Number | Name | Date |
|---|---|---|
| 1,735,782 | Oldham | Nov. 12, 1929 |
| 1,959,713 | Goff | May 22, 1934 |
| 2,081,089 | Frese | May 18, 1937 |

FOREIGN PATENTS

| Number | Country | Date |
|---|---|---|
| 60,364 | Netherlands | Dec. 15, 1947 |